United States Patent [19]

Kobashi et al.

[11] Patent Number: 4,760,804
[45] Date of Patent: Aug. 2, 1988

[54] AIR INJECTION CULTIVATOR

[75] Inventors: Teruhisa Kobashi; Ichiro Kobashi; Masanori Iwai, all of Okayama, Japan

[73] Assignees: Kobashi Kogyo Co., Ltd., Okayama; Fuji Robin Kabushiki Kaisha, Tokyo, both of Japan

[21] Appl. No.: 916,019

[22] Filed: Oct. 6, 1986

[30] Foreign Application Priority Data

Dec. 12, 1985 [JP] Japan ................. 60-279949

[51] Int. Cl.⁴ ............................................. A01B 37/00
[52] U.S. Cl. ........................................ 111/7; 172/166; 172/415; 172/699
[58] Field of Search ............... 111/6, 7, 7.1–7.4; 137/115; 251/25; 405/269; 299/13, 14, 16, 36; 172/166, 699, 415

[56] References Cited

U.S. PATENT DOCUMENTS

| 2,895,665 | 7/1959 | McSweeney | 137/115 |
| 3,448,757 | 6/1969 | Mercier | 137/115 |
| 3,546,886 | 12/1970 | Jones et al. | 111/7.1 |
| 3,956,999 | 5/1976 | English | 111/7 |
| 3,967,564 | 7/1976 | Emling | 111/7 |
| 4,566,543 | 1/1986 | Kotani | 111/6 |
| 4,570,553 | 2/1986 | Ito | 111/6 |
| 4,660,480 | 4/1987 | Zinck | 111/7 |

FOREIGN PATENT DOCUMENTS

| 59-42801 | 3/1984 | Japan | 111/7 |
| 276575 | 11/1970 | U.S.S.R. | 111/7 |
| 753380 | 8/1980 | U.S.S.R. | 111/7 |

Primary Examiner—James R. Feyrer
Attorney, Agent, or Firm—Martin A. Farber

[57] ABSTRACT

A cultivator has a blade downwardly projected from a frame, an injector provided at a lower portion of the blade, a compressor mounted on the frame and an air tank for storing air compressed by the compressor. An unloading valve provided in a hydraulic circuit for supplying compressed air in the air tank to the injector. The unloading valve is arranged to be opened when the pressure in the air tank is higher than a predetermined value. A master valve is provided in the circuit means, for passing the compressed air to the injector. A mechanical valve is provided to be opened when the depth of the injector reaches a predetermined value, so that the compressed air is supplied to the master valve to open it, whereby air is injected from the injector when the pressure in the air tank is higher than the predetermined value at the predetermined position of the injector.

5 Claims, 4 Drawing Sheets

4,760,804

AIR INJECTION CULTIVATOR

BACKGROUND OF THE INVENTION

The present invention relates to a tractor-drawn cultivator having a blade which cultivates the soil with air injected from a nozzle or injector provided on a lower portion of the blade which is forced into the soil.

Japanese Utility Model Laid-Open Nos. 57-125201 and 59-29102, for example, disclose cultivators each provided with an aerating device, attached to a tractor by a three-point linkage. The cultivator has a long vertical blade or shank provided with an injector at a lower portion thereof.

Such a cultivator is constructed to continuously inject compressed air from the injector at predetermined intervals. The cultivator is lowered by the three-point linkage to the surface of a field or fruit garden, and further the blade with the injector is inserted in the soil a predetermined sufficient depth to perform desired deep cultivation. The cultivation and aeration are performed while the tractor advances. When the operation is over, the cultivator is raised by the three-point linkage above the ground.

However, if the air is injected before the blade and injector reach the predetermined depth, the compressed air will spout out blowing up the soil. Consequently, holes are made in the field thereby affecting plants cultivated therein. It is also dangerous if the compressed air is discharged when the injector is above the ground.

In order to avoid such troubles, there have been proposed air injection systems. In one of the systems, a cultivator is provided with a valve in an air-supply passage to control the air flow. The drive of the cultivator opens the valve after the injector is sufficiently inserted in the soil. In another system, a vertically movable gauge wheel which automatically detects the position of the injector in the soil is provided to operate the valve when the injector reaches a predetermined position.

However, in the former system a mechanism for operating the valve is required. In addition, the driver must confirm that the injector is inserted the predetermined depth and perform a particular manual operation for opening the valve. In the latter, since a controlling means including the gauge wheel is provided, the machine becomes complicated in construction and heavy in weight. Moreover, each of both systems is constructed to inject air regardless of the air pressure in an air tank. Consequently, air may be injected into the soil at low pressure, resulting in insufficient cultivation.

SUMMARY OF THE INVENTION

The object of the present invention is to provide an improved cultivator which may automatically detect the depth of an injector and start the aerating operation only when the injector is inserted into the soil a predetermined depth, in the condition of a predetermined pressure of air in an air tank.

The other objects and features of this invention will become understood from the following description with reference to the accompanying drawings.

DETAILED DESCRIPTION OF THE PREFERRED EMBODIMENT

Figure 1:
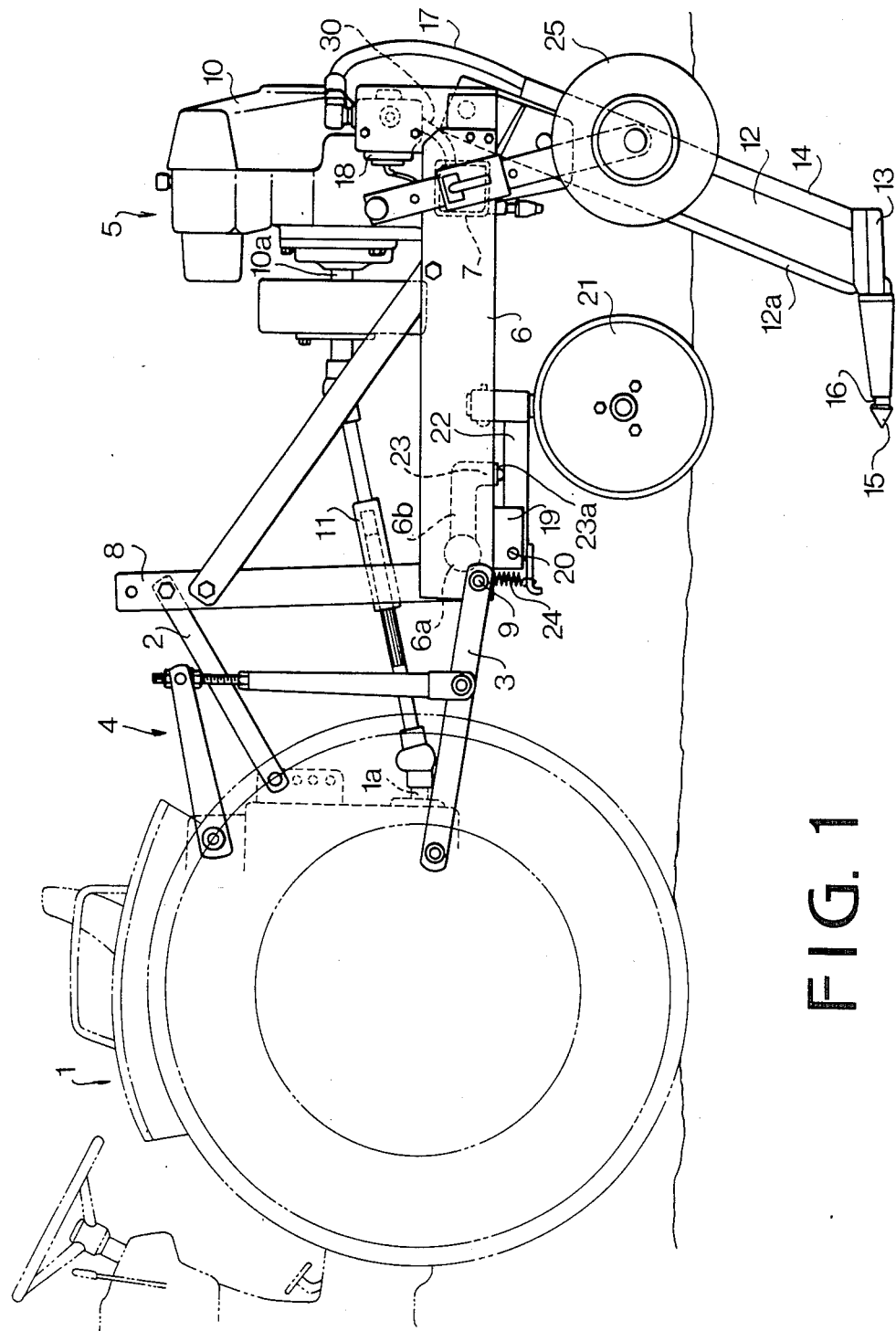
FIG. 1 is a side elevational view of a cultivator according to the present invention.
Figure 2:
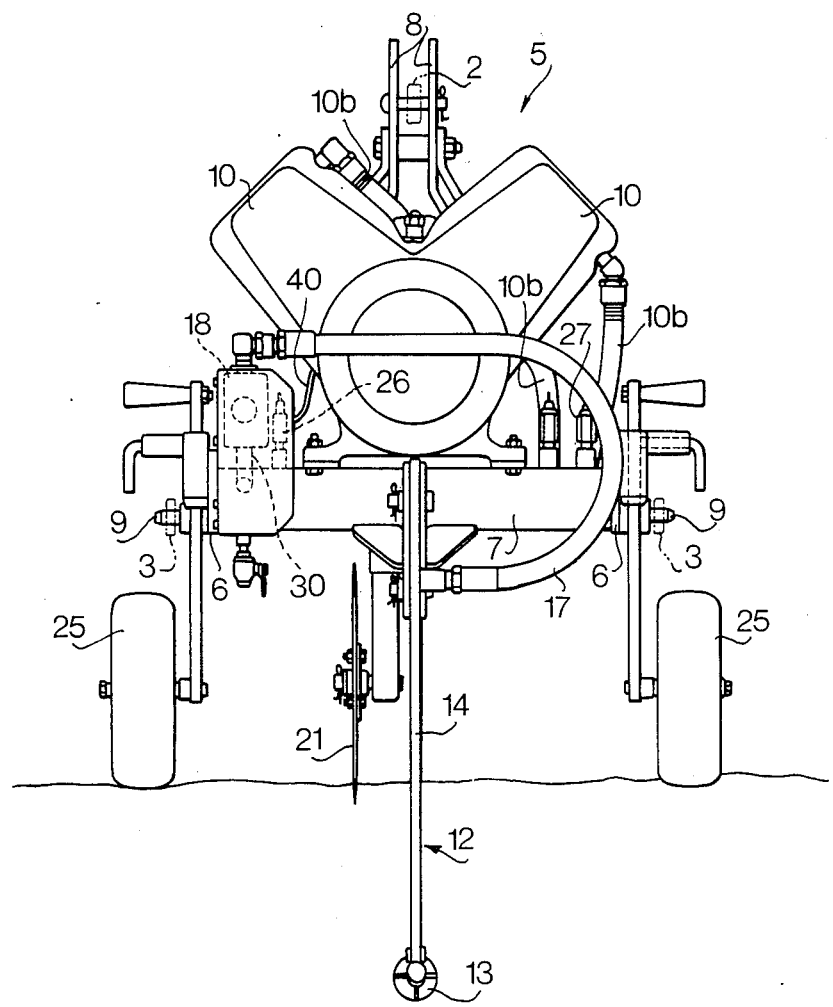
FIG. 2 is an elevation as viewed from the rear of the cultivator of FIG. 1.
Figure 3:
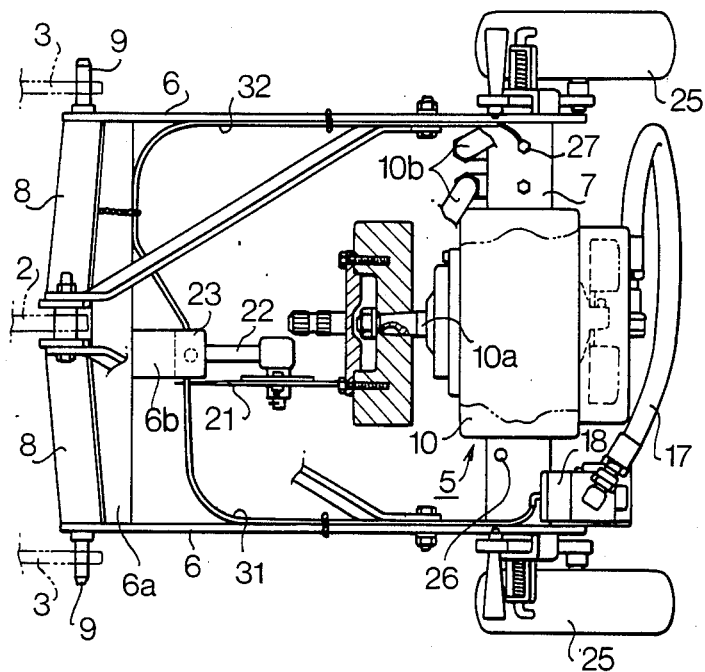
FIG. 3 is a plan view of the machine.

Referring to FIGS. 1 to 3, a tractor 1 is provided with a three-point (hitch) linkage 4 comprising a top link 2 and a pair of lower links 3. The linkage 4 is connected to a cultivator 5 so as to lower and raise the cultivator 5.

The cultivator 5 has a frame having a pair of side plates 6 and a lateral pipe 6a disposed between the side plates 6 at a front portion thereof. A pair of topmasts 8 which are secured to the side plates 6 are connected to the top link 2 at an upper portion and to the lower links 3 by lower link pins 9. Secured to the rear end of the frame 6 is an air tank 7 having a square cross section, which also serves as a lateral frame member. The tractor 1 is also provided with a power take-off shaft 1a so as to transmit the power of an engine to an input shaft 10a of a compressor 10 through a transmission system 11 comprising universal joints and a propeller shaft.

The air compressed by the compressor 10 passes through a pipe and is stored in the air tank 7. Although the compressor 10 and the air tank 7 are disposed on a rear portion of the cultivator 5, they may be provided closer to the tractor 1.

A downwardly extending shank or blade 12 having an edge 12a at a front portion thereof is secured by way of a holding member to the air tank 7 at the middle portion thereof. An injector 13 is secured to the lower end of the blade and an air-supply pipe 14 communicated with the injector is fixed to the back of the blade 12. The injector 13 comprises an arrow-shaped head portion 15 having a nozzle 16 formed in an upper portion of the head portion 15 so as to upwardly inject air.

Figure 5:
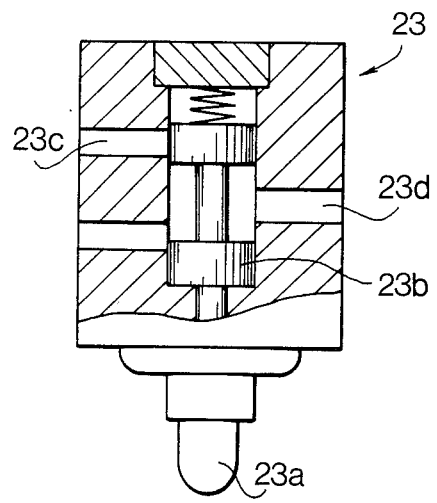
FIG. 5 is a sectional view of a mechanical valve.

Secured to the pipe 6a is a bracket 19 extending downwardly at a substantially middle portion thereof. A swing arm 22, with a colter 21, the position of which is adjustably secured thereto, is pivotally mounted by a pin 20 on the bracket 19 so as to rotate in a vertical plane. Also secured to the pipe 6a is a rearwardly extending supporting member 6b to which a mechanical valve 23 having a downwardly projected lug 23a is attached. As shown in FIG. 5 the mechanical valve has a piston 23b connected to the lug 23a, inlet and outlet ports 23c and 23d. When the colter 21 touches the ground and the arm 22 is upwardly rotated, the lug 23a is pushed by the swing arm 22 thereby communicating the inlet port 23c with outlet port 23d. The movement of the swing arm 22 is limited by stoppers (not shown) provided on the bracket 19, so that the swing arm 22 is prevented from further rotating in the counterclockwise direction in FIG. 1 after contact with the lug 23a, or in the clockwise direction beyond a certain point slightly below the lug 23a while the colter 21 is above the ground. A tension spring 24 is provided between the pipe 6a and a front end portion of the swing arm 22 so as to prevent the swing arm 22 from swinging by vibration of the cultivator, causing malfunction of the mechanical valve 23, when the colter 21 is above the ground. A pair of gauge wheels 25 are provided on rear ends of the side plates 6 for adjusting the cultivating depth of the blade 12 and the injector 13.

Figure 4:
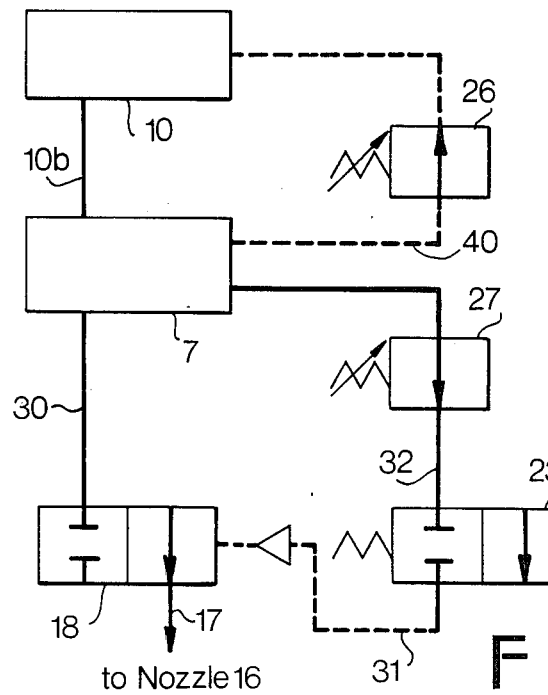
FIG. 4 is a block diagram of an air injection system.

A system for controlling the aerating operation is now explained with reference to FIG. 4. The air is compressed by the compressor 10 and supplied to the air tank 7 through pipes 10b. A return pipe 40 having a first unloading valve 26 is disposed between the air tank 7 and the compressor 10 so as to discharge the air from the air tank 7 when the pressure in the air tank 7 exceeds a certain value. That is, when the pressure in the air tank 7 becomes higher than 10 Kg/cm$^2$, for example, the first unloading valve 26 is opened so that the air in the air tank 7 is returned to the compressor 10.

Figure 6:
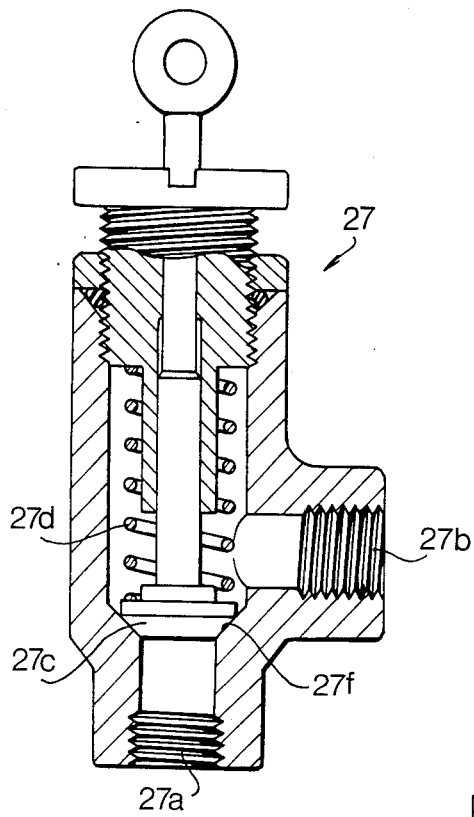
FIG. 6 is a sectional view of a second unloader.

The air tank 7 is communicated with the air-supply pipe 14 of the blade 12 through a pipe 30, master valve 18 provided above the air tank 7 and pipe 17. A second unloading valve 27 is provided in a passage 32 communicating the tank 7 with mechanical valve 23. The second unloading valve, as shown in FIG. 6, has an inlet 27a, outlet 27b, valve 27c and spring 27d for urging the valve to a seat 27f. The inlet 27a is communicated with outlet 27b when the pressure in the air tank 7 is higher than a predetermined value, for example, 9.5 kg/cm$^2$. The outlet 27b of the second unloading valve 27 is also communicated with the inlet 23c of the mechanical valve 23 through a pipe 32. The outlet 23d of mechanical valve 23 is communicated with a pilot port 18e (FIG. 7) of the master valve 18 through a pipe 31.

Figure 7:
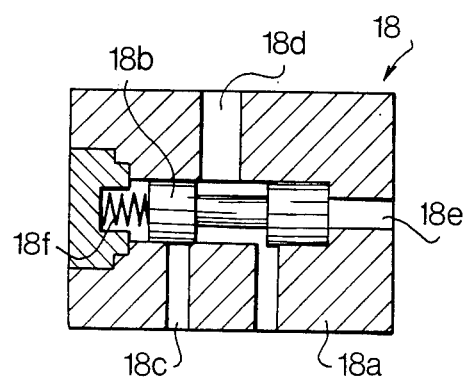
FIG. 7 is a sectional view of a master valve.

Referring to FIG. 7, the master valve 18 is a piston valve having a valve body 18a, a spool 18b, an inlet 18c communicated with the pipe 30, and an outlet 18d communicated with the pipe 17. The valve body 18a has a pilot port 18e communicated with the pipe 31 for applying air pressure to one end of the spool 18b. A compressed spring 18f is provided between the other end of the spool 18b and the valve body 18a to urge the spool to the right so as to close the inlet 18c.

The operation of the machine will be described hereinafter. The cultivator 5 is connected to the tractor 1 by three-point linkage 4 and the power of the tractor is transmitted to the input shaft 10a of the compressor 10 through the power take-off shaft 1a and the transmission system 11 so as to drive the compressor 10. The blade 12 and injector 13 are held above the ground until the tractor reaches a field. Since the colter 21 is not on the ground, the swing arm 22 is disengaged from the lug 23a of the mechanical valve 23 to close it. Accordingly, even if the pressure in the air tank 7 becomes higher than 9.5 Kg/cm$^2$ to cause the second unloading valve 27 to open, the master valve 18 is kept closed so that air is not injected through the compressor 10 is driven. When the air pressure rises above 9.5 Kg/cm$^2$, the second unloading valve 27 opens.

For aerating operation the cultivator 5 is lowered by the three-point linkage 4. As the cultivator 5 is drawn by the tractor 1, the blade 12 and the injector 13 are gradually plunged deeper into the soil by the weight of the cultivator until the gauge wheels 25 touch the ground. At the position shown in FIG. 1, the blade 12 is inserted deep enough so that the colter 21 touches the ground causing the swing arm 22 to push the lug 23a thereby opening the mechanical valve 23. Accordingly, compressed air passes through the unloading valve 27, the pipe 32, mechanical valve 23 to the pilot port 18e of the master valve 18 to push the spool 18b to the left against the urging of the spring 18f. Therefore, inlet 18c and outlet 18d are communicated. Consequently, the compressed air is forcibly injected into the soil through the pipe 17, air-supply pipe 14, head portion 15 and nozzle 16. By the injection of the compressed air, the pressure in the air tank 7 decreases below 9.5 Kg/cm$^2$, so that the unloading valve 27 is closed. Accordingly, the air injection is interrupted until the air regains pressure over 9.5 Kg/cm$^2$.

Thus, as the blade 12 cuts through the soil, the air is intermittently injected so that cracks are opened up in the deep layers of the soil. By repeating the operation, cracked areas are continuously formed and the soil is loosened. Additionally, the roots of plants in these areas are supplied with fresh air, namely oxygen.

After the aerating operation, the cultivator 7 is raised by the three-point linkage 4. As the colter 21 leaves the ground, the swing arm 22 rotates in the clockwise direction about the pin 20 thereby disengaging the lug 23a. Therefore, the mechanical valve 23 is closed and the master valve 18 is also closed. Accordingly, the air injection is automatically terminated.

The cultivator 5 may be provided with other automotive means or with other linkage besides three-point linkage. Further, other means for the detection of the depth and for the operation of the mechanical valve 23 may be employed.

From the foregoing, it will be understood that the present invention provides a cultivator wherein the compressed air is injected only when the injector is deeply inserted in the ground and the air in the air tank has a predetermined pressure. Therefore, the blow up of soil which affects the plants is prevented.

Furthermore, neither switching means or wheel are necessary to operate the master valve so that the machine is of simplified construction, light in weight and cheaply manufactured.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A cultivator comprising:

a frame;

first means for connecting the frame to a tractor;

at least one blade secured to the frame, the blade being downwardly porjected from the frame and having an edge at the forward side thereof;

an injector provided at a lower portion of the blade;

a compressor mounted on the frame drivable by a power take-off shaft of the tractor;

an air tank communicating with the compressor for storing air compressed by the compressor;

a first unloading valve provided for discharging air in the air tank when the pressure of the air in the air tank becomes higher than a first predetermined value;

pneumatic circuit means for supplying the compressed air in the air tank to the injector;

a second unloading valve provided in the pneumatic circuit means so as to open when the pressure in the air tank is higher than a second predetermined value which is smaller than the first predetermined value;

a fluid-operated master valve provided in the circuit means for passing the compressed air to the injector when said master valve is opened;

a mechanical valve in the circuit means for passing the compressed air passing through the second unloading valve to the master valve to open the master valve when the injector is inserted in the soil a predetermined depth, whereby air is injected from the injector when the pressure in the air tank is higher than the second predetermined value at the predetermined depth of the injector.

2. The cultivator according to claim 1, further comprising a return pipe between said air tank and said compressor, said first unloading valve is disposed in said return pipe for returning air in the air tank to the compressor when said first unloading valve discharges the air.

3. The cultivator according to claim 1, wherein said master valve has a slide member and a spring biasing said slide member into a closed position of said master valve, said slide member being shiftable to open said master valve by the compressed air passing through the second unloading valve via said mechanical valve.

4. The cultivator according to claim 1, wherein said mechanical valve has a slide member and a spring biasing said slide member into a closed position of said mechanical valve, and a projection lug means, when pressed, for shifting said slide member so as to open said mechanical valve when the injector is inserted in the soil to said predetermined depth.

5. The cultivator according to claim 4, further comprising a swing arm pivotally connected to said frame, a colter mounted on said swing arm, said swing arm for pressing said projection lug means when said colter touches the soil when the injector is inserted in the soil to said predetermined depth.

* * * * *